(12) United States Patent
Dillon

(10) Patent No.: US 7,493,087 B2
(45) Date of Patent: Feb. 17, 2009

(54) APPARATUS AND METHOD OF RADIO ACCESS MANAGEMENT FOR A RADIO COMMUNICATION SYSTEM

(75) Inventor: Matthew J. Dillon, Hawthorn Woods, IL (US)

(73) Assignee: Motorola; Inc., Schaumburg, IL (US)

( * ) Notice: Subject to any disclaimer, the term of this patent is extended or adjusted under 35 U.S.C. 154(b) by 513 days.

(21) Appl. No.: 10/568,140

(22) PCT Filed: Sep. 2, 2004

(86) PCT No.: PCT/EP2004/052010

§ 371 (c)(1),
(2), (4) Date: Feb. 9, 2006

(87) PCT Pub. No.: WO2005/041607

PCT Pub. Date: May 6, 2005

(65) Prior Publication Data

US 2007/0010270 A1    Jan. 11, 2007

(30) Foreign Application Priority Data

Oct. 20, 2003   (GB)   ................... 0324520.6

(51) Int. Cl.
*H04B 1/00*   (2006.01)
*H04B 15/00*  (2006.01)

(52) U.S. Cl. ............... 455/63.1; 455/67.11; 455/67.13; 455/226.3; 455/423

(58) Field of Classification Search ............ 455/63.1, 455/67.11, 67.13, 226.3, 513, 226, 423, 424, 455/425, 439, 456.1
See application file for complete search history.

(56) References Cited

U.S. PATENT DOCUMENTS 6,061,337 A   5/2000  Light et al.

(Continued)

FOREIGN PATENT DOCUMENTS

EP   1 032 237 A1   8/2000

(Continued)

OTHER PUBLICATIONS

Pedersen K I et al.: "The downlink orthogonality factors influence on WCDMA system performance", VTC 2002-Fall. 2002 IEEE 56TH Vehicular Technology Conference Proceedings, Vancouver, Canada, Sep. 24-28, 2002, IEEE Vehicular Technology Conference, New York, NY: IEEE, US vol. vol. 1 of 4. Conf. 56, Sep. 24, 2002, pp. 2061-2065.

*Primary Examiner*—Tuan A Pham

(57) ABSTRACT

The invention relates to access management in a radio communication system. A subscriber unit (101) transmits an access message to a base station (103). A Radio Access Controller (RNC) (109) receives information of the access request. The RNC (109) comprises an interference characteristic processor (111) which determines an interference characteristic associated with the subscriber unit (101). The interference characteristic may include an inter-cell interference factor and an intra-cell orthogonality factor determined as a function of the distance between the base station and the subscriber unit and/or based on subscriber unit measurements of pilot signals from the selected base station (103) and neighbouring base stations (105, 107). The interference characteristic processor (111) is coupled to a resource requirement processor (113) which determines a resource requirement for achieving a desired signal to interference ratio for the requested service in response to the interference characteristic. The RNC (109) further comprises an access controller (115) which accepts or rejects the request in response to the determined resource requirement.

13 Claims, 2 Drawing Sheets

U.S. PATENT DOCUMENTS

| | | | |
|---|---|---|---|
| 6,701,130 B1 * | 3/2004 | Hamalainen et al. | 455/67.11 |
| 7,127,267 B2 * | 10/2006 | McGowan et al. | 455/522 |
| 2002/0001292 A1 | 1/2002 | Miyamoto | |
| 2003/0096618 A1 * | 5/2003 | Palenius | 455/453 |
| 2003/0224813 A1 * | 12/2003 | Lehtinen et al. | 455/513 |

FOREIGN PATENT DOCUMENTS

| | | |
|---|---|---|
| EP | 1 063 788 A | 12/2000 |
| EP | 1 189 466 A | 3/2002 |
| EP | 1 313 345 A2 | 5/2003 |
| WO | WO 95/22857 A | 8/1995 |
| WO | WO 00/25444 A1 | 5/2000 |
| WO | WO 02/093777 A | 11/2002 |

\* cited by examiner

| CELL DISTANCE (m) | β | EDGE FACTOR |
|---|---|---|
| 200 | 0.1 | 0.7 |
| 400 | 0.2 | 0.7 |
| 600 | 0.3 | 0.8 |
| 800 | 0.3 | 0.9 |
| 1000 | 0.3 | 1.0 |
| 1200 | 0.4 | 1.1 |
| 1400 | 0.5 | 1.2 |
| 1600 | 0.5 | 1.3 |
| 1800 | 0.6 | 1.4 |

APPARATUS AND METHOD OF RADIO ACCESS MANAGEMENT FOR A RADIO COMMUNICATION SYSTEM

FIELD OF THE INVENTION

The invention relates to an apparatus and a method of radio access management for a radio communication system and in particular but not exclusively to a system for access management in a CDMA cellular communication system.

BACKGROUND OF THE INVENTION

In a cellular communication system, a geographical region is divided into a number of cells each of which is served by base station. The base stations are interconnected by a fixed network, which can communicate data between the base stations. A mobile station is served via a radio communication link by the base station of the cell within which the mobile station is situated.

As a mobile station moves, it may move from the coverage of one base station to the coverage of another, i.e. from one cell to another. As the mobile station moves towards base station, it enters a region of overlapping coverage of two base stations and within this overlap region it changes to be supported by the new base station. As the mobile station moves further into the new cell, it continues to be supported by the new base station. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. One carrier is used for a pilot signal which further contains broadcast information. This carrier is used by mobile stations for measuring of the signal level of transmissions from different base stations, and the obtained information is used for determining a suitable serving cell during initial access or handovers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) wherein user separation is obtained by allocating different spreading and scrambling codes to different users on the same carrier frequency. The transmissions are spread by multiplication with the allocated codes thereby causing the signal to be spread over a wide bandwidth. At the receiver, the codes are used to de-spread the received signal thereby regenerating the original signal. Each base station has a code dedicated for a pilot and broadcast signal, and as for GSM this is used for measurements of multiple cells in order to determine a serving cell. An example of a communication system using this principle is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a UMTS CDMA communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless subscriber units over a radio link being part of the air interface. The wireless subscriber unit may be a mobile station, a communication terminal, a personal digital assistant, a laptop computer, an embedded communication processor or any communication element communicating over the air interface. The RAN comprises the base stations, which in UMTS are known as Node Bs, as well as Radio Network Controllers (RNC), which control the Node Bs and the communication over the air interface.

When a mobile station initiates a call or accesses a new cell for setting up a soft-handover leg in UMTS, it transmits an initial access message to the appropriate base station. This access message is known as a RACH (Random Access Channel) message. In UMTS, the RACH access mechanism uses a slotted ALOHA protocol wherein the random access channel is divided into discrete time slots that can be used for accessing the base station. The base station broadcasts timing information that the mobile station uses to synchronise to the time slots of the RACH channel. The mobile station transmits the RACH message by choosing a RACH time slot at random, and transmitting the RACH message in this time slot.

When the base station receives the RACH information message, it generates a data packet comprising the contained information and communicates it to a Radio Network Controller (RNC). The RNC is in charge of resource allocation for the air interface, and in response to the received information it proceeds to allocate communication resource to the originating mobile station or to reject the access request. The RNC communicates the required information back to the base station, which in response proceeds to setup and configure the communication link with the mobile station or to inform the mobile station of the rejection.

Effective radio access control is essential for an efficient resource utilisation and in particular for an efficient resource utilisation in a CDMA communication system where there is a balance between capacity and the performance of the system.

In conventional CDMA access control methods, a resource requirement associated with an access message is determined and the mobile station is admitted or rejected depending on this resource requirement. Specifically, a given requested service is typically known to require a specific signal to interference ratio and have a given bit rate. A required transmit power is determined that is guaranteed to result in required signal to interference ratio regardless of the specific operating conditions of the individual mobile station. Thus, each service is considered to have a corresponding nominal resource requirement which depends only on the service itself and not on the current or specific operating conditions. This resource requirement is used to decide whether to access or reject the mobile station.

However, this is clearly a very inaccurate approach as conditions for different mobile stations may vary considerably. Especially, for lower spreading factors, practical measurements show that a downlink transmit power may vary y between typically 1 and 10 W for the same service dependent. This variation may correspond to 20% or more of the total available transmit power in a cell. Clearly, admission decisions based on a conservative resource estimate will allow for acceptable performance of the admitted mobile stations but will result in many access requests being rejected which could have been adequately supported by the base stations. This will cause the cell to be under-loaded and will result in dropped calls and a reduced capacity of the communication system as a whole. However, using a less conservative estimate may allow more mobile stations but the base station may in some cases not be able to support all the admitted services resulting in degraded performance and possibly dropped calls for all the mobile stations supported. Thus, it is clear that current access control algorithms are suboptimal and result in degraded performance and capacity of the communication system.

Hence, an improved system for access control in a radio communication system would be advantageous and in particular a system allowing for a more accurate resource determination, an improved performance and an increased capacity.

EP1032237 A1 (Motorola) addresses the problem of uplink (subscriber to base station) control, allowing the subscriber to benefit from power control information being sent from multiple base stations and using the best information to limit the power output of subscriber units with impaired uplinks to certain base stations. As such it does not address the current problem of downlink resource allocation for new calls.

WO2000/25444 A1 (Roke) is another uplink scheme to reduce total power output from the subscriber unit during bursts of on/off periods, and does not address the current problem of downlink resource allocation for new calls.

US2002/001292 A1 (Miyamoto) is a downlink power control scheme allowing the minimum power control window to be exceeded on demand within an existing call channel. Consequently it does not address the current problem of downlink resource allocation for new calls.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for a radio communication system comprising: means for receiving an access message transmitted from a subscriber unit to a base station; means for determining an interference characteristic associated with the subscriber unit; and means for determining a resource requirement for achieving a desired signal to interference ratio in response to the interference characteristic.

The invention may allow an improved access control based on an increased accuracy of the resource requirement. The actual interference characteristics may be taken into account and thus the resource requirement may reflect the current conditions in which the subscriber unit operates. Hence, individual resource requirements appropriate for the individual subscriber unit and its current operating conditions are preferably determined. The invention may allow an improved performance and/or increased capacity of the radio communication system as a whole. The desired signal to interference ratio is preferably dependent on a service associated with the access message.

Preferably the means for determining the interference characteristic and the means for determining the resource requirement are located in the network and may for example be situated in the base station, in a Radio Network Controller or distributed between different network elements.

According to a different feature of the invention, the means for determining the interference characteristic is operable to determine a distance characteristic indicative of a distance between the subscriber unit and the base station and to determine the interference characteristic in response to the distance characteristic.

Interference conditions may typically vary with the distance between a subscriber unit and the base station and typically the intra-cell and inter-cell interference may increase with increasing distance. The feature may thus provide a convenient and practical measure of a likely interference characteristic for the current subscriber unit. An improved resource requirement may be determined leading to a more precise and accurate admission control and thus resource management. The distance characteristic need not be a direct line of sight distance between the base station and the subscriber unit but may for example relate to an average or estimated propagation path including scattering. The distance characteristic need not be an accurate estimate but may for example be a rough determination of a presumed distance. For example, the distance characteristic may simply indicate if the subscriber unit is located in an inner or outer area of the cell.

According to a different feature of the invention, the means for determining the interference characteristic is operable to determine the distance characteristic in response to a propagation delay associated with a communication between the subscriber unit and the base station.

This feature may allow an efficient, simple and sufficiently reliable determination of e.g. a distance between the subscriber unit and the base station. The propagation delay may be related to an uplink and/or downlink communication and the determination may be based on explicit exchange of timing information. The propagation delay may be determined in the network including the base station or may alternatively or additionally be determined at the subscriber unit.

According to a different feature of the invention, the distance characteristic comprises a ratio between an estimated distance between the subscriber unit and the base station and a cell radius associated with the base station. This allows for a simple to derive distance characteristic being determined which is suitable for determination of the interference characteristic and thus the resource requirement.

According to a different feature of the invention, the means for determining the interference characteristic is operable to determine the interference characteristic in response to a predetermined variation of the interference characteristic as a function of the distance characteristic. For example, a predetermined variation may be determined based on drive tests or empirical data. The feature allows for reduction of the computational complexity while resulting in sufficiently reliable results.

According to a different feature of the invention, the predetermined function is a substantially linear function. This allows a particularly simple implementation.

According to a different feature of the invention, the means for determining the interference characteristic is operable to determine the interference characteristic in response to empirical data indicating an association between the interference characteristic and the distance characteristic. This feature enables an accurate determination which may be accurately reflect the current conditions. Specifically, it may enable accurate measurements to easily be used for determining the resource requirement.

According to a different feature of the invention, the means for determining the interference characteristic is operable to determine the interference characteristic in response to simulation data indicating an association between the interference characteristic and the distance characteristic. This feature may enable an accurate determination and allows for a practical approach for generating information related to the required relationship. The feature may further enable or improve a determination in situations where no empirical or measured data is available or is suboptimal.

According to a different feature of the invention, the apparatus further comprises means for receiving signal measurement data from the subscriber unit and the means for determining the interference characteristic is operable to determine the interference characteristic in response to the signal measurement data. This feature may allow for the current interference characteristics to be directly or indirectly determined based on measurements of characteristics of signals. Specifically, measurements may be made of one or more pilot signals allowing for current and reliable interference conditions to be determined.

According to a different feature of the invention, the signal measurement data comprises a measured signal to interference ratio of a signal of the base station. The signal to interference ratio of the base station measured at the subscriber unit is a particularly suitable parameter for determining an interference characteristic, which may be used to determine a more accurate resource requirement.

According to a different feature of the invention, the means for determining the interference characteristic is operable to determine the interference characteristic in response to the measured signal to interference ratio and a known transmitted signal to interference ratio of the base station. A reduction of the signal to interference ratio from the known transmitted signal to interference ratio to an actual measured signal to interference ratio is an accurate indication allowing an accurate determination of the resource requirement associated with the access message.

According to a different feature of the invention, the interference characteristic comprises an intra-cell interference ratio and the means for determining the interference characteristic is operable to compensate for an inter-cell interference component of the measured signal to interference ratio. This may allow an accurate determination of the intra-cell interference ratio as separate from the inter-cell interference. As the effects, remedies and behaviour of these interferences may be different this may allow an improved accuracy of the determined resource requirement.

According to a different feature of the invention, the signal measurement data comprises measured signal to interference ratios associated with the base station and a plurality of neighbouring base stations and the means for determining the interference characteristic is operable to determine the interference characteristic comprising an inter-cell interference measure in response to the measured signal to interference ratios associated with the base station and the plurality of neighbouring base stations. This provides for a practical, efficient and/or accurate way of determining an inter-cell interference measure being at least part of the interference characteristic.

According to a different feature of the invention, the means for determining the interference characteristic is operable to determine an interference bias associated with the subscriber unit and to determine the interference characteristic in response to the bias. Specifically, a relative bias indicating a deviation from a nominal interference characteristic may be determined. This may facilitate determination of the resource requirement and provide for an accurate determination.

According to a different feature of the invention, the interference characteristic comprises an inter-cell interference factor. Advantageously, the interference characteristic comprises an inter-cell interference factor allowing the resource requirement to be determined in response to inter-cell interference conditions. Thus, improved accuracy of the determined resource requirement may be determined.

According to a different feature of the invention, the means for determining the interference characteristic is operable to determine the inter-cell interference factor in response to a path loss estimate of a radio communication link between the subscriber unit and the base station and path loss estimates of radio communication links between the subscriber unit and a plurality of neighbour base stations. This provides for a practical, efficient and/or accurate way of determining an inter-cell interference factor being at least part of the interference characteristic.

According to a different feature of the invention, the interference characteristic comprises an intra-cell interference factor. Advantageously, the interference characteristic comprises an intra-cell interference factor allowing the resource requirement to be determined in response to intra-cell interference conditions. Thus, improved accuracy of the determined resource requirement may be determined.

According to a different feature of the invention, the intra-cell interference factor comprises an intra-cell orthogonality factor. Typically, a base station for a CDMA transmits signals to a plurality of subscriber units using orthogonal codes. Scattering of the transmitted signal causes the orthogonality to be reduced and typically the reduction increases with distance resulting in increased interference. Hence, the intra-cell orthogonality factor provides a particularly suitable parameter for determining the interference characteristic and the resource requirement.

According to a different feature of the invention, the means for determining the resource requirement is further operable to determine the resource requirement in response to a noise level. This may allow improved accuracy of the determined resource requirement and may particularly improve accuracy in low interference scenarios.

According to a different feature of the invention, the resource requirement is a power requirement. Typically, communication systems have a transmit power limitation for each base station. Preferably the resource requirement is directly determined as a power value required for supporting the service associated with the access message. This may directly be related to the transmit power limitation. Hence, the power requirement may be a suitable resource criterion for determining access control in a radio system.

According to a different feature of the invention, the resource requirement is a relative power requirement. The power resource may in some scenarios preferably be a relative requirement. This may be particularly advantageous in situations where determination of absolute power values is cumbersome, impractical, impossible or inaccurate. The relative power requirement may for example be relative to a current or maximum transmit power of the base station.

According to a different feature of the invention, the apparatus comprises means for determining if the resource requirement is less than an available resource for the base station and for admitting access of the subscriber unit only if the resource requirement is less than the available resource. This allows a highly efficient, easy to implement, low complexity and/or high performance admission control for a radio communication system.

According to a different feature of the invention, the resource requirement is associated with a downlink resource of the base station. This allows an efficient, practical, high performance and/or accurate resource determination and resource management for a downlink resource.

Preferably, the radio communication system is a CDMA communication system.

According to a second aspect of the invention, there is provided a method of radio access management comprising the steps of receiving an access message from a subscriber unit at a base station; determining an interference characteristic associated with the subscriber unit; and determining a resource requirement for achieving a desired signal to interference ratio in response to the interference characteristic.

These and other aspects, features and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The following description focuses on an embodiment of the invention applicable to downlink resource management in a CDMA cellular communication system. However, it will be appreciated that the invention is not limited to this application but may be applied to many other resources and radio communication systems.

Figure 1:
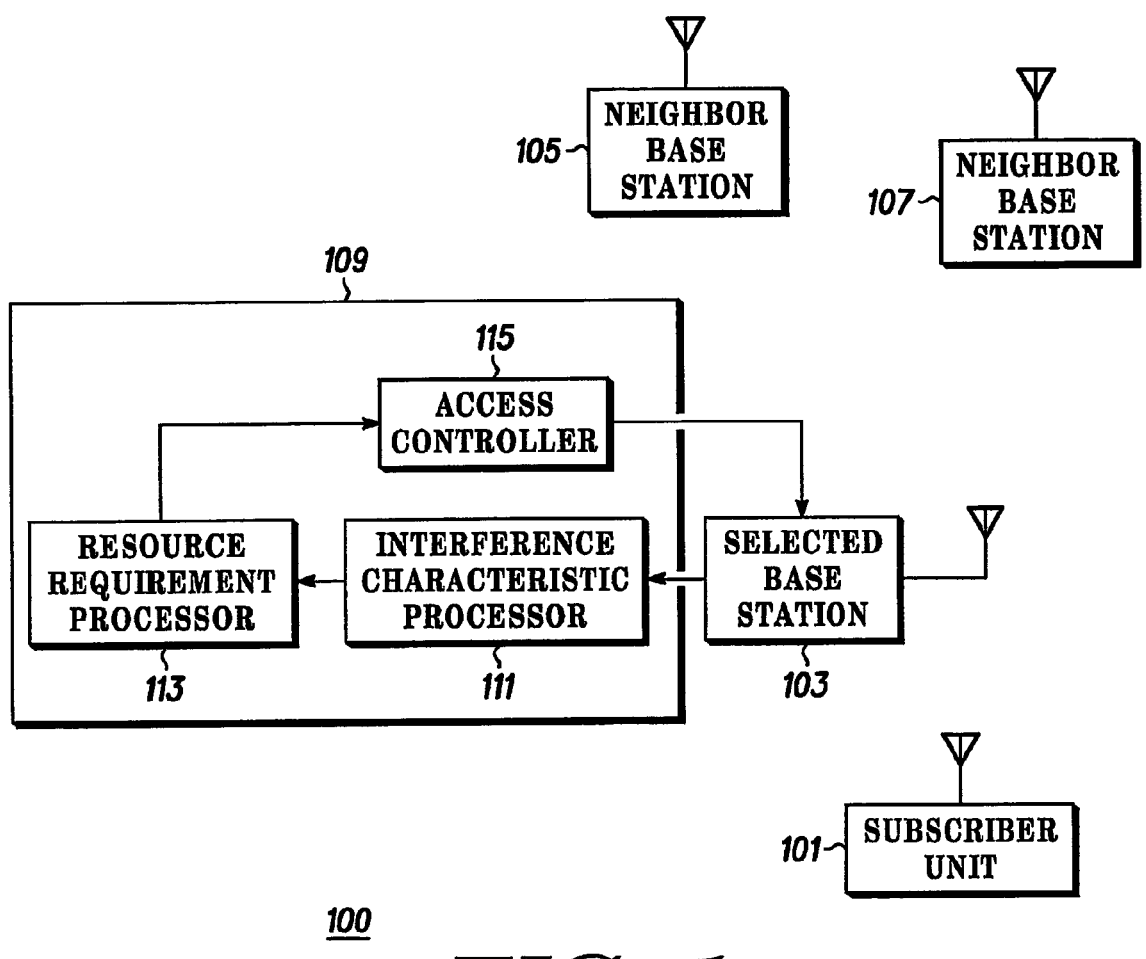
FIG. 1 illustrates a cellular communication system in accordance with an embodiment of the invention.

FIG. 1 illustrates a cellular communication system in accordance with an embodiment of the invention. In the specific example the cellular communication system is a UMTS cellular communication system.

In the example of FIG. 1, a subscriber unit 101 is associated with a selected base station 101. Initially the subscriber unit 101 is in an idle state but is camped on the selected base station 101. Two neighbouring base stations 105, 107 are illustrated in FIG. 1.

An embodiment of the invention will be described with reference to an example wherein the subscriber unit 101 initiates a new service. However, it will be appreciated that the invention is not limited to this example but is equally applicable in many other situations including for example if the subscriber unit accesses the selected base station 101 in order to perform a hard handover or to set up a soft handover link.

In the specific example, the subscriber unit 101 initiates a service request procedure by generating an access message and transmitting this to the selected base station 103 in accordance with the requirements and specifications of the UMTS communication system. The selected base station 103 is operable to receive the access message in accordance with requirements and specifications of the UMTS communication system. In the described embodiment the access message comprises information identifying the requested service.

Figures 2, 3:
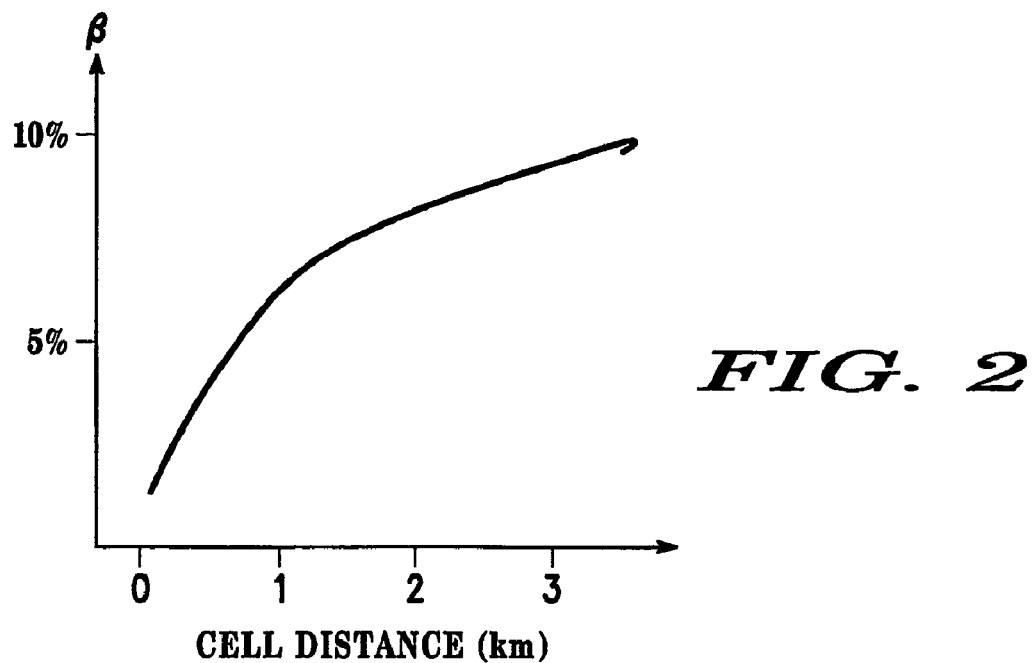
FIG. 2 illustrates an example of a variation of the intra-cell orthogonality factor as a function of distance between the subscriber unit and the base station.
FIG. 3 illustrates an example of a table distance values and their associated inter-cell interference factor and intra-cell orthogonality factor values.

In the example of FIG. 3, the selected base station 103 is coupled to a Radio Network Controller (RNC) 109 which comprises access management functionality. Specifically, in the described embodiment, the RNC 109 comprises admission control functionality for deciding if a service request can be accommodated or should be rejected.

In the described embodiment, the RNC 109 comprises an interference characteristic processor 111 which is operable to determine an interference characteristic associated with the subscriber unit. In the preferred embodiment, the interference characteristic is indicative of a current interference operating condition of the subscriber unit 101. The interference characteristic need not be an accurate estimate or measure of the current interference environment but may simply be a characteristic determined or estimated based on one or more parameters related to an operating condition or physical location of the subscriber unit. Hence, the interference characteristic is not identical for all subscriber units in the cell but is related to the specific subscriber unit transmitting the access request.

The interference characteristic processor 111 is coupled to a resource requirement processor 113 and feeds the interference characteristic thereto. The resource requirement processor 113 is operable to determine a resource requirement required to support the requested service.

The resource requirement is determined on the basis of a signal to interference ratio associated with the requested service. Typically, a downlink signal to interference ratio required to meet the quality of service requirements of a given service are known. Thus, in the described embodiment the resource requirement processor 113 comprises information related to a required signal to interference ratio at the subscriber unit 101 for all possible services that may be requested. Alternatively or additionally, the resource requirement processor 113 may comprise functionality for accessing an external network element to retrieve this information. For example, the information may be stored in a central database such as a database comprised in an Operations and Management Center (OMC).

The resource requirement is further determined in response to the interference characteristic determined by the interference characteristic processor 111. Specifically, the resource requirement may be in the form of a downlink transmit power that must be allocated in the base station 103 to support the service. The required downlink transmit power may be determined by determining the transmit power that will result in the required signal to interference ratio at the subscriber unit based on an interference level estimated from the interference characteristic and an estimated path loss between the base station 103 and the subscriber unit 101.

The resource requirement processor 113 is coupled to an access controller 115 which is operable to determine if the service request is accepted or rejected in response to the determined resource requirement. Specifically, the access controller 115 monitors the currently allocated transmit power for the base station 103. The access controller 115 furthermore has information of a transmit power limit of the base station 103. In a simple embodiment, the access controller 115 simply adds the determined resource requirement to the currently allocated transmit power and compares the result to a threshold corresponding to the transmit power limit. If the sum total transmit power is below the threshold, the service request is accepted and if it is above the threshold it is rejected.

The access controller 115 is coupled to the base station 101 and is operable to control the base station 101 to transmit the messages associated with the access procedure or the rejection procedure of the communication system.

Thus, an improved accuracy of the resource requirement estimate associated with a service request may be improved by the described embodiment by determining an interference characteristic associated with the specific subscriber unit rather than simply using a nominal or average estimate for all subscriber units of the cell. The improved accuracy allows for a much more precise resource allocation and an improved access control. Thus, fewer service requests are rejected and the probability of causing an unacceptable degradation to existing services may be significantly reduced. Hence, improved performance of the access control is achieved leading to improved performance and increased capacity of the communication system as a whole.

The preferred embodiment of the invention will be described in more detail in the following with reference to FIG. 1.

A specific equation that may be used to determine a resource requirement and specifically a relative downlink transmit power requirement is given by:

$$UserAdm = \alpha \frac{(E_b/N_o)}{PG}[(1-\beta) + f]$$

wherein $\beta$ is an intra-cell interference factor, f is an inter-cell interference factor, $E_b/N_O$ is the desired signal to noise ratio, $\alpha$ is the voice activity factor and PG is the processing gain given by $$PG = \frac{W}{UserBitRate}$$

where W is carrier chip rate and the UserBitRate is proportional to the spreading factor.

In a UMTS communication system, the RNC generally has information related to the voice activity factor, the carrier bit rate, the processing gain, the user bit rate and the required signal to noise ratio. Hence, the only unknown variables are the interference parameters $\beta$ and f. The $\beta$- and f-factors are typically the main contributors towards non-uniform power requirements between different subscriber units. Accordingly, rather than use nominal or average values for these parameters, the interference characteristic processor 111 of the described embodiment determines estimates in response to a specific characteristic or parameter associated with the individual subscriber unit 101.

Thus in accordance with the embodiment of the invention, the RNC uses information available from system elements in order to estimate the intra-cell interference factor and the intra to inter-cell interference factor. This affects the user's power level and makes the admission process much more accurate.

Specifically, the intra-cell interference factor $\beta$ is an intra-cell orthogonality factor. For CDMA communication systems such as UMTS, downlink transmissions to different subscriber units are synchronised and transmitted using orthogonal codes. Thus, at the point of transmission the interference from signals to other subscriber units may in principle be completely removed and not cause any deterioration in a receiver. However, due to scattering and multi-path, the orthogonality cannot be maintained.

Typically, the ratio of channel power which cannot be recovered at a receiver increases with the distance from the base station due to the increasing variation in the separation of the multi-path. This is known as Rician fading and occurs due to the strong direct line of sight paths that exist for users close to the base station. This effect is lost after entering the diffraction zone where local scatters become the dominant source of power.

Thus, the intra-cell orthogonality factor $\beta$ typically varies substantially with distance between a subscriber unit and the base station. FIG. 2 illustrates an example of a variation of the intra-cell orthogonality factor $\beta$ as a function of distance between the subscriber unit and the base station.

Similarly, the inter-cell interference factor f varies significantly as a function of the distance between the base station and the subscriber unit. Specifically, interference from other cells increases as a subscriber unit moves further from the cell center towards the cell edge.

In the described embodiment, the interference characteristic comprises both the intra-cell interference factor and the inter-cell interference factor. However, it will be appreciated that in other embodiments the interference characteristic may comprise none or only one of these interference factors.

In some embodiments, the interference characteristic is determined in response to a distance characteristic indicative of a distance between the subscriber unit and the base station. Specifically, the interference characteristic processor 111 may be operable to determine an estimated distance between the base station and the subscriber unit and to determine values for the $\beta$-factor and f-factor in response to this distance characteristic.

Specifically, the interference characteristic processor 111 may determine a bias for each of the interference factors relative to a nominal value. For example, a minimum value of each of the $\beta$-factor and the f-factor corresponding to a subscriber unit close to the base station may be known. This minimum value may be increased by the interference characteristic processor 111 dependent on the distance between the subscriber unit and the base station.

In UMTS, each call set-up initiates by an access message being transmitted on the RACH channel. When the subscriber unit is camped on a single base station, the subscriber unit uses the timing reference of this cell for the transmission of access messages. This allows propagation delays between the subscriber unit and the base station to be calculated and accordingly enables that the distance between the subscriber unit and the base station is estimated from the propagation delay.

In the technical specifications developed by the $3^{rd}$ Generation Partnership Project (3GPP), a propagation delay information element is optionally attached to a common channel header along with the RACH information. The propagation delay corresponds to the earliest arriving ray and thus the minimum distance from the cell to the mobile. It is specified to a resolution of 3 chips corresponding to around 100 meters. Hence, in some embodiments the propagation delay is measured and used to relatively accurately measure a distance between the subscriber unit and the base station.

In the described embodiment, the intra-cell orthogonality factor and the inter-cell interference factor are determined using one or more of different possible approaches. Furthermore, in the described embodiment the absolute distance is related to the maximum cell radius to generate a relative distance measure. Thus, the distance estimate is normalised to the maximum radius of the cell.

One approach for determining a suitable interference factor is to use a predetermined variation of the intra-cell orthogonality factor and inter-cell interference factor as a function of the distance. For example, a function expressing the relationship between the relative distance and the $\beta$-factor may be determined and stored in the interference characteristic processor 111. Accordingly, when the access message is received, the interference characteristic processor 111 estimates the distance and evaluates the predetermined function based on this estimate. The resultant inter-cell interference factor is then fed to the resource requirement processor 113 where this value is used to determine the resource requirement in accordance with the previously described equation.

In a simple embodiment, a simple linear function is used to determine the interference factors. For example, the smallest and largest values of the interference factors may have been estimated or measured (corresponding to a position close to the base station and one at the cell edge). The interference factors may then be determined from:

$$\beta = \beta_{min} + r \cdot (\beta_{max} - \beta_{min})$$

and $$f = f_{min} + r \cdot (f_{max} - f_{min})$$

where r is the distance normalised to the maximum cell radius.

Alternatively or alternatively, the interference factors may be determined based on empirical data. For example, measured data may have been compiled for both inter-cell interference and intra-cell orthogonality at different locations in the cells. The measurements may for example have been made during dedicated measurement operations including drive testing or may have been made for ongoing calls in the cell. The measurements are preferably processed to generate a relationship between the relative cell distance and the interference factor. For example, a look-up table may be generated which relates the relative distance of a subscriber unit to the corresponding inter-cell interference factor and intra-cell orthogonality factor values. FIG. 3 illustrates an example of table distance values and their associated inter-cell interference factor and intra-cell orthogonality factor values.

As another example, the interference factors may additionally or alternatively be based on simulation data. Thus, simulations may be carried out to determine how the interference factors vary across a cell. Preferably a look up table similar to the one described for empirical data is developed. Furthermore, the look-up tables for the empirical and simulated data may be combined e.g. by the table originally being based on simulation data with these values gradually being adjusted in response to performed measurements.

Preferably one or more of the above described approaches is used. Specifically, the interference characteristic processor 111 may be operable to determine a distance characteristic and evaluate if empirical data exist for this value. If so, the empirical data is used to determine the interference factors. Otherwise it is determined if simulation data exist and if so this data is used. Otherwise, the interference factors are determined based on the predetermined function.

In some embodiments, signal measurement data may be included in the determination of the interference characteristic.

For example, the inter-cell interference factor and/or the intra-cell orthogonality factor may be determined in response to subscriber unit measurements of the pilot signals of the selected base station and/or other base stations.

Specifically, the inter-cell interference factor may in some embodiments be determined by the subscriber unit measuring signal to interference ratios for the base station and a plurality of neighbouring base stations. These ratios may be determined by measurements on the pilot signal from the base stations as is known in the art. The interference characteristic processor 111 may determine the inter-cell interference factor f from the equation:

$$f = \Sigma Ec/Ioc/Ec/Ios$$

where Ec/Ioc are the linearised signal to interference ratios for the neighbouring cells and Ec/Ios is the linearised signal to interference ratio for the selected cell.

The intra-cell orthogonality factor may for example be computed in response to a measured signal to interference ratio of a signal of the base station and specifically in response to the measured signal to interference ratio compared to a known transmitted signal to interference ratio of the base station.

Hence, in this embodiment, the base station may receive a measured Ec/Io from the subscriber unit indicating the signal to interference ratio measured at the subscriber unit. The base station furthermore has knowledge of the downlink signal to interference ratio Ec/Ior of the signal as transmitted from the base station. The difference between these values is indicative of the increased interference due to the inter-cell interference and the intra-cell orthogonality factor.

Assuming the inter-cell interference can be ignored without unacceptable degradation, the intra-cell orthogonality factor may be determined from the difference between the known and the measured signal to interference ratio values. For example, an intra-cell orthogonality factor bias may simply be calculated as $$bias = 1 \cdot Ec/Ior/Ec/Io$$

and the corresponding intra-cell orthogonality factor value as:

$$\beta = \beta_{min} + bias \cdot (\beta_{max} - \beta_{min})$$

In a more accurate embodiment, the measured signal to interference ratio is compensated for the inter-cell interference component before the bias is calculated. Specifically, the inter-cell interference determined when determining the inter-cell interference factor may be subtracted from the interference component of the measured signal to interference ratio.

It will be appreciated that the interference characteristic may be determined e.g. based on both the distance characteristic and signal measurement approach for increased accuracy. For example, the individually determined $\beta$- and f-factors may be weighted and summed to determine a combined $\beta$- and f-factor.

In some embodiments, a different version of the equation for determining the resource requirement may be used. Specifically, the resource requirement for subscriber unit i may be determined from the following equation:

$$\theta_i \phi P = \left(\frac{E_b}{N_o}\right)_i \cdot \frac{\alpha_i}{PG_i}\left[(1-\beta_i)P + P\sum_{n=1,n\neq m}^{N}\frac{L_{m,i}}{L_{n,i}} + N_o W \cdot L_{m,i}\right]$$

where
P is the total power limit per base station (for simplicity assumed to be identical for all base stations in the above equation),
φ is the fraction of total base station power which is dedicated to traffic (and hence 1−φ is the control channel power fraction),
$\theta_i$ is the fraction of total traffic power required for $i^{th}$ subscriber unit,
α is the channel activity factor for $i^{th}$ subscriber unit,
$\beta_i$ is the intra-cell orthogonality factor observed by $i^{th}$ subscriber unit (e.g. determined in accordance with the above described approach)
$PG_i$ is processing gain of $i^{th}$ subscriber unit,
$(E_b/N_o)_i$ is the required energy per bit over noise density for $i^{th}$ subscriber unit for the requested service,
$L_{m,i}$ is pathloss between serving cell m and $i^{th}$ subscriber unit, and
$L_{n,i}$ is pathloss between neighbouring cell n and $i^{th}$ subscriber unit.

Thus, the right hand side of the above equation provides an accurate estimate of the absolute transmit power required to support a service requested by subscriber unit i. By dividing this value by φ·P, an accurate estimate of the fraction of total power required to support the service is obtained. This may be compared to an available fraction of the transmit power currently available and a decision whether to accept or reject the request may be made accordingly.

It should be noted that in the above equation, the inter-cell interference factor is determined in response to a path loss estimate of a radio communication link between the subscriber unit and the base station and path loss estimates of radio communication links between the subscriber unit and a plurality of neighbour base stations. Hence, the inclusion of path loss data for a plurality of cells in the measurement report enables a more accurate calculation of the required power.

It should also be noted that in the above equation, the resource requirement is furthermore determined in consideration of the noise level. Thus, an additional term is included which adds the noise power. It will be appreciated that in interference limited operating conditions this term may be insignificant.

The invention can be implemented in any suitable form including hardware, software, firmware or any combination of these. However, preferably, the invention is implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. An apparatus for a radio communication system comprising:
   means for receiving an access message transmitted from a subscriber unit to a base station;
   means for determining a distance characteristic between the subscriber unit and the base station using a propagation delay of the access message;
   means for receiving a measured signal to interference ratio of a signal of the base station data from the subscriber unit;
   means for determining an interference characteristic including an intra-cell interference factor and an inter-cell interference factor associated with the subscriber unit in response to the measured signal to interference ratio and the distance characteristic between the subscriber unit and the base station; and
   means for determining a resource requirement for achieving a desired signal to interference ratio in response to the interference characteristic;
   wherein the resource requirement of the means for determining a resource requirement is a relative downlink transmit power requirement given by:

$$UserAdm = \alpha \frac{(E_b/N_o)}{PG}[(1-\beta) + f]$$

wherein β is the intra-cell interference factor, $f$ is the inter-cell interference factor, $E_b/N_o$ is the desired signal to noise ratio, α is the voice activity factor and PG is the processing gain given by $$PG = \frac{W}{UserBitRate}$$

where W is carrier chip rate and the UserBitRate is proportional to the spreading factor.

2. An apparatus as claimed in claim 1 wherein the means for determining the interference characteristic is operable to determine the intra-cell interference factor and the inter-cell interference factor in response to the distance characteristic by biasing each of the interference factors relative to a nominal value.

3. An apparatus as claimed in claim 1 wherein the distance characteristic comprises a ratio between an estimated distance between the subscriber unit and the base station and a cell radius associated with the base station.

4. An apparatus as claimed in claim 2 wherein the nominal value is a minimum value that is increased dependent on an increased distance between the subscriber unit and the base station.

5. An apparatus as claimed in claim 1 wherein the means for determining the interference characteristic is operable to determine the interference characteristic in response to empirical data indicating an association between the interference characteristic and the distance characteristic.

6. An apparatus as claimed in claim 1 wherein the means for determining the interference characteristic is operable to determine the interference characteristic in response to simulation data indicating an association between the interference characteristic and the distance characteristic.

7. An apparatus as claimed in claim 4 wherein the interference factors are determined from:

$$\beta = \beta_{min} + r \cdot (\beta_{max} - \beta_{min})$$

and $$f = f_{min} + r \cdot (f_{max} - f_{min})$$

where r is the distance normalized to the maximum cell radius, $\beta$ is the intra-cell interference factor, and $f$ is the inter-cell interference factor.

8. An apparatus as claimed in claim 1 wherein a look-up table may be generated which relates the relative distance of a subscriber unit to the corresponding inter-cell interference factor and intra-cell interference factor values.

9. An apparatus as claimed in claim 1 wherein the intra-cell interference factor comprises an intra-cell orthogonality factor.

10. An apparatus as claimed in claim 1 wherein measured data has been compiled for both the inter-cell interference factor and an intra-cell orthogonality interference factor at different locations in the cells.

11. An apparatus as claimed in claim 10 wherein an intra-cell orthogonality factor bias can be calculated as $$\text{bias} = 1 - (Ec/Ior)/(Ec/Io)$$

where Ec/Ior is the downlink signal to interference ratio, and the corresponding intra-cell orthogonality factor value as:

$$\beta = \beta_{min} + \text{bias} \cdot (\beta_{max} - \beta_{min}).$$

12. An apparatus as claimed in claim 1 wherein the resource requirement for subscriber unit i can be determined from the following equation:

$$\theta_i \phi P = \left(\frac{E_b}{N_o}\right)_i \cdot \frac{\alpha_i}{PG_i} \left[ (1 - \beta_i) P + P \sum_{n=1, n \neq m}^{N} \frac{L_{m,i}}{L_{n,i}} + N_0 W \cdot L_{m,i} \right]$$

where
P is the total power limit per base station,
$\phi$ is the fraction of total base station power which is dedicated to traffic,
$\theta_i$ is the fraction of total traffic power required for $i^{th}$ subscriber unit, $\alpha$ is the channel activity factor for $i^{th}$ subscriber unit,
$\beta_i$ is the intra-cell orthogonality factor observed by $i^{th}$ subscriber unit,
$PG_i$ is processing gain of $i^{th}$ subscriber unit,
$(E_b/N_o)_i$ is the required energy per bit over noise density for $i^{th}$ subscriber unit for the requested service,
$L_{m,i}$ is pathloss between serving cell m and $i^{th}$ subscriber unit, and
$L_{n,i}$ is pathloss between neighboring cell n and $i^{th}$ subscriber unit.

13. A method of radio access management for a radio communication system, the method comprising the steps of:
receiving an access message from a subscriber unit at a base station;
determining a distance between the subscriber unit and the base station using a propagation delay of the access message;
receiving a measured signal to interference ratio of a signal of the base station data from the subscriber unit;
determining an interference characteristic including an intra-cell interference factor and an inter-cell interference factor associated with the subscriber unit in response to the measured signal to interference ratio and the distance between the subscriber unit and the base station; and
determining a resource requirement for achieving a desired signal to interference ratio in response to the interference characteristic;
wherein the resource requirement of the means for determining a resource requirement is a relative downlink transmit power requirement given by:

$$UserAdm = \alpha \frac{(E_b/N_o)}{PG}[(1 - \beta) + f]$$

wherein $\beta$ is the intra-cell interference factor, $f$ is the inter-cell interference factor, $E_b/N_o$ is the desired signal to noise ratio, $\alpha$ is the voice activity factor and PG is the processing gain given by $$PG = \frac{W}{UserBitRate}$$

where W is carrier chip rate and the UserBitRate is proportional to the spreading factor.

* * * * *